United States Patent Office 3,436,363
Patented Apr. 1, 1969

3,436,363
POLYMERIZATION OF ETHYLENE IN AQUEOUS SYSTEM
Arthur F. Helin, Kansas City, Mo., assignor, by mesne assignments, to Gulf Oil Corporation, Pittsburgh, Pa., a corporation of Pennsylvania
No Drawing. Continuation of application Ser. No. 44,839, July 25, 1960. This application Apr. 8, 1968, Ser. No. 719,716
Int. Cl. C08f 1/13, 15/02, 37/00
U.S. Cl. 260—29.6                          9 Claims

ABSTRACT OF THE DISCLOSURE

Ethylene polymers are prepared by an emulsifying polymerization process in the absence of an emulsifying agent.

CROSS-REFERENCE TO OTHER APPLICATION

This is a continuation application of application Ser. No. 44,839 filed July 25, 1960, by Arthur F. Helin.

This invention relates to polymeric materials. More particularly, this invention is concerned with ethylene polymers in stable emulsions and processes of producing the same.

According to the present invention there are provided novel aqueous emulsions of polymerized ethylene. The emulsions are latices of good stability and do not require an emulsifying agent for their creation or maintenance.

The novel emulsions of this invention can be produced by polymerizing ethylene in an aqueous medium with a polymerizable ethenoid unsaturated mono or polybasic (particularly dibasic) carboxylic acid or sulfonic acid, and especially such acids containing not more than 12 carbons, and advisably not more than 6 carbons.

Representative acids of the described types which can be used in the process are acrylic acid, methacrylic acid, crotonic acid, itaconic acid, fumaric acid, cinnamic acid, maleic acid, citraconic acid, ethylene sulfonic acid and styrene sulfonic acid.

In addition to the free acids, salts and esters thereof can be used in the process.

The polymerization can be effected in a batch or continuous operation. For a batch operation, water and a polymerizable ethenoid unsaturated acid can be added to an autoclave, the air purged by evacuation and ethylene then used as a flush. Ethylene is then admitted under pressure, the contents heated with agitation and a suitable polymerization initiator added. After the polymerization has progressed sufficiently to form an emulsion having an adequately high solids content, which can be measured by periodic sample withdrawals, the polymerization can be terminated as by cooling the autoclave and discharging the white, fluid latex.

Any suitable polymerization temperatures and pressures can be used in the process. Thus pressures of 2000 to 20,000 p.s.i. can be used although pressures of 2500 to 4500 p.s.i. are particularly suitable for the polymerization. Temperatures of 60 to 150° C. are suitable for effecting the reaction although from 70 to 120° C. is advisably employed. It is to be understood, however, that particular temperature-pressure relationships are to be used which give the desired stable aqueous latex and not conditions which might pervert this objective.

Ethylene initiators used in the process include the alkali metal persulfates and particularly sodium or potassium persulfate. A sufficient amount of initiator is used to effect polymerization of the ethylene to give the desired solids content. Generally, from about 0.05 to 2.0 parts by weight of initiator based on 100 parts of the liquid reaction medium are adequate. Furthermore, an initiator will obviously be selected which will effect the polymerization under the conditions desired.

The amount of unsaturated acid used in the polymerization to produce the emulsion will depend to some extent upon the particular acid used, the solids content desired, and the properties sought in the resulting polymer. However, generally from at least about 1 to 60% by weight of an unsaturated acid based on the weight of ethylene polymerized, and advisably from 1 to 10% is used in the polymerization.

Water soluble organic liquids which do not interfere adversely with the polymerization can be used in conjunction with water. A liquid with a boiling point significantly below water should be used so that it can be removed from the emulsion by distillation once it is formed. Some such liquids which can be used are alcohols and particularly t-butanol. Such a solvent can be used in amounts up to about 40% by weight of the water although not more than 25% is usually used.

The polymerization can be effected at essentially any pH and especially from about pH 2 to 12.

The polymerization can be continued until the solids concentration reaches any suitable level but for practical reasons is not generally continued much above about 25 to 30% by weight of solids based on the total weight of the emulsion. Higher concentrations produced directly by the polymerization process often do not have physical properties such as polymer particle size and viscosity as suitable as those of lower concentrations. The polymerization is ordinarily carried to at least about 12% solids by weight because of economic factors.

After the polymerization is terminated any solvent or organic liquid present, such as t-butanol, can be flashed off. Then, if desired, the emulsion can be concentrated by distillation under reduced pressure to bring the solids content up, such as to about 40 to 50% by weight.

The ethenoid unsaturated acid apparently forms a copolymer with ethylene.

Treatment of the emulsion with sodium hydroxide, sodium chloride and hydrochloride acid to allow pH, in that order, causes the latex to precipitate. The resinous polymer can then be isolated as by filtration and dried. The polymers are high melting solids with densities often of the range 0.94 to 0.95 and melting points from 90° to 150° C.

The emulsions provided by this invention are useful in paper coating, textile finishing, polishes, surface coatings, as, for example, paints and industrial finishes.

The following examples are presented to illustrate the invention.

Example 1

To a mixture of 1600 g. of distilled water and 300 g. of tert-butanol was added 30 g. of methacrylic acid and the solution was placed in a 1-gallon Magne-Dash autoclave. The head space was purged of air by evacuating, then flushing twice with ethylene at 100 lb./sq. in. pressure. Ethylene was then admitted until a pressure of 900 lb./sq. in. was attained. The charge was heated with agitation to 80° C. at which time a solution of 5.0 g. of potassium persulfate in 100 ml. of water was pumped in. The pressure was then adjusted to 3000 lbs./sq. in. After 1 hour an additional 1.25 g. of potassium persulfate was added in 25 g. of water. During the course of about six hours a polymerization reaction took place. As the ethylene was used up, more ethylene was added to maintain the pressure at 3000 lb./sq. in. Samples were withdrawn at intervals and analyzed for total solids content. When the level of total solids reached 20%, the reaction was terminated by cooling the autoclave and the product was discharged. The product was a white, fluid latex containing a small amount of separated solid polymer.

A portion of the latex was coagulated as follows: To 100 ml. of latex was added 300 ml. of water, 100 ml. of 10% sodium hydroxide solution and 100 ml. of 10% sodium chloride solution. After mixing there was added with vigorous stirring a solution of 60 ml. of concentrated hydrochloric acid in 140 ml. of water. The mixture was heated to 50° C., cooled to room temperature and the coagulum filtered off. The filter cake was reslurried with 300 ml. of water and filtered again. The polymer was air dried.

Example 2

To a mixture of 1600 g. of distilled water and 300 g. of tert-butanol was added 30 g. of distilled methacrylic acid and the solution was placed in a 1 gallon Magne-Dash autoclave. The vessel was purged, charged with ethylene, brough up to reaction temperature and potassium persulfate added as in Example 1. The pressure was adjusted to 3000 lb./sq. in. After about 1 hour, 1.25 g. of potassium persulfate was added in 25 g. of water and this was repeated one hour later. Ethylene was added and samples were withdrawn as in Example 1. The reaction was terminated after 6 hours and the product was discharged. The product was a white fluid latex containing 18% solids. After coagulation as in Example 1 a polymer was obtained having a density of 0.9457 g./ml. and a melting point of 88–95° C. It was only partially soluble in Tetralin at 135° C.

Example 3

To a mixture of 1600 g. of distilled water and 300 g. of tert-butanol was added 60 g. of methacrylic acid and the solution was placed in a 1-gallon Magne-Dash autoclave. The vessel was sealed, purged, charged with ethylene, and brought up to temperature, catalyst added and pressure adjusted as in Example 1, except that 6.0 g. of potassium persulfate in 119 ml. of water was added as the initial catalyst charge. After 1½ hours, an additional 1.2 g. of potasium persulfate in 23.8 ml. of water was added. After 6½ hours the reaction was terminated. The product was a fluid, white latex containing 20.3% total solids containing a small amount of separated polymer. After coagulation as in Example 1, a polymer was obtained having a density of 0.9500. It was partially insoluble in Tetralin at 135° C. and did not flow under pressure at 125° C. An analysis of the polymer gave a carbon content of 81.53% corresponding to a polymer composition weight ratio of 86/14 ethylene/methacrylic acid.

Example 4

A 30 g. portion of maleic acid was dissolved in 1600 g. of distilled water and 300 g. of tert-butanol was added. The solution was placed in a 1-gallon Magne-Dash autoclave and the vessel was sealed, purged, charged with ethylene, brought up to temperature, catalyst added, and pressure adjusted as in Example 1. After 1½ hours, 1.2 g. of potassium persulfate dissolved in 23.8 g. of water was added and this was repeated at 2¼, 5¼ and 6 hours. After 7½ hours the temperature was raised to 100° C. and at 8 hours another 1.2 g. of potassium persulfate in 23.8 g. of water was added. The reaction was terminated after 9½ hours. The product was a white latex containing 11.4% total solids. The polymer isolated from this latex melted at 98–106° C.

Example 5

A 30 g. portion of methacrylic acid was dissolved in 1600 g. of distilled water and the solution was placed in a 1-gallon Magne-Dash autoclave. The vessel was sealed, purged, charged with ethylene, and brought up to temperature as in Example 1. A solution of 4.8 g. of potassium persulfate in 95.2 g. of water was added and the pressure was adjusted to 3000 lb./sq. in. After 1½ hours a solution of 1.2 g. of potassium persulfate in 23.8 ml. of distilled water was added and this was repeated at 3½ and at 4 hours. At 6 hours the temperature was raised to 95° C. After 8 hours the polymerization was terminated. The product was a white liquid containing 13% total solids. Some polymer was present in the form of a powder. Polymer isolated from the latex, as described in Example 1, was only partly soluble in Tetralin at 135° C. It did not flow in the melt indexer at 190° C. and did not mold to form specimens for density and melting point determinations. The carbon content of the polymer was 74.24% corresponding to a composition weight ratio of 62/38 ethylene/methacrylic acid.

Various changes and modifications of the invention can be made and, to the extent that such variations incorporate the spirit of this invention, they are intended to be included within the scope of the appended claims.

In the claims:

1. The process of producing aqueous emulsions of ethylene polymers which comprises polymerizing a polymerizable reaction mixture at a temperature of about 60 to 150° C. and a pressure of about 2,000 to 20,000 p.s.i. until at least 12% by weight of solids are present in the emulsion, said polymerizable reaction mixture consisting of ethylene, water, an alkali metal persulfate, and an acid monomer of the group consisting of ethenoid unsaturated carboxylic acids and ethenoid unsaturated sulfonic acids of not more than 12 carbon atoms, said polymerizable reaction mixture containing 1 to 60% by weight, based on the ethylene, of said acid monomer and 0.05 to 2.0 parts by weight, based on 100 parts by weight of water, of said alkali metal persulfate.

2. The process of producing aqueous emulsions of ethylene polymers which comprises polymerizing a polymerizable reaction mixture at a temperature of about 70 to 120° C. and a pressure of about 2,500 to 4,500 p.s.i. until at least 12% by weight of solids are present in the emulsion, said polymerizable reaction mixture consisting of ethylene, water, an alkali metal persulfate, and an acid monomer of the group consisting of ethenoid unsaturated carboxylic acids and ethenoid unsaturated sulfonic acids of not more than 12 carbon atoms, said polymerizable reaction mixture containing 1–10% by weight, based on the ethylene, of said acid monomer and 0.05 to 2.0 parts by weight, based on 100 parts by weight of water, of said alkali metal persulfate.

3. The process of claim 2 in which the aqueous liquid reaction medium contains up to about 40% by weight of t-butanol.

4. The process of claim 2 in which methacrylic acid is used as the ethenoid unsaturated carboxylic acid.

5. The process of claim 2 in which maleic acid is used as the ethenoid unsaturated carboxylic acid.

6. The process of producing aqueous emulsions of ethylene polymers which comprises polymerizing a polymerizable reaction mixture at a temperature of about 60–150° C. and a pressure above about 2,000 p.s.i. until at least about 12% by weight of solids are present in the emulsion, said polymerizable reaction mixture consisting of ethylene, water, an alkali metal persulfate, and an acid monomer of the group consisting of ethenoid unsaturated carboxylic acids, and ethenoid unsaturated sulfonic acids, said polymerizable reaction mixture containing 1 to 60% by weight, based on the ethylene, of said acid monomer and 0.05 to 2.0 parts by weight based on 100 parts by weight of water, of said alkali metal persulfate.

7. The process of producing aqueous emulsions of ethylene polymers which comprises polymerizing a polymerizable reaction mixture at a temperature of about 10–150° C. and a pressure above about 1,500 p.s.i. until at least about 12% of solids are present in the emulsion, said polymerizable reaction mixture being free of emulsifier and consisting essentially of ethylene, water, an alkali metal persulfate, and an acid monomer of the group consisting of ethenoid unsaturated carboxylic acids and ethenoid unsaturated sulfonic acids, said polymerizable reaction mixture containing .1 to 60% by weight, based on the ethylene, of said acid monomer and 0.05 to 2.0 parts by weight, based on 100 parts by weight of water, of said alkali metal persulfate.

8. The process of producing aqueous emulsions of ethylene polymers which comprises polymerizing a polymerizable reaction mixture at a temperature of about 60 to 150° C. and a pressure of about 2,000 to 20,000 p.s.i. until at least 12% by weight of solids are present in the emulsion, said polymerizable reaction mixture consisting of ethylene, water, a water-soluble persulfate polymerization initiator, and an acid monomer of the group consisting of ethenoid unsaturated carboxylic acids and ethenoid unsaturated sulfonic acids, of not more than 12 carbon atoms, said polymerizable reaction mixture containing 1 to 60% by weight, based on the ethylene, of said acid monomer and 0.05 to 2.0 parts by weight, based on 100 parts by weight of water, of said water-soluble persulfate polymerization initiator.

9. The process of claim 8 in which the acid monomer is an unsaturated monocarboxylic acid.

References Cited

UNITED STATES PATENTS

| | | | |
|---|---|---|---|
| 2,296,403 | 9/1942 | Renfrew | 260—89.5 |
| 2,300,920 | 11/1942 | Heuer | 260—29.6 |
| 2,387,755 | 10/1945 | Hanford | 260—78.5 |
| 2,462,390 | 2/1949 | Harmon | 260—29.6 |
| 2,449,489 | 9/1948 | Larson | 260—29.6 |
| 2,914,499 | 11/1954 | Sheetz | 260—29.6 |

FOREIGN PATENTS 813,814   5/1959   Great Britain.

SAMUEL H. BLECH, *Primary Examiner.*

P. LIEBERMAN, *Assistant Examiner.*

U.S. Cl. X.R.

117—155, 161; 260—78.5, 79.7, 86.1, 88.1